United States Patent
Satake et al.

[11] Patent Number: 6,130,492
[45] Date of Patent: Oct. 10, 2000

[54] BRUSHLESS THREE-PHASE SYNCHRONOUS GENERATOR HAVING ENHANCED ROTOR FIELD SYSTEM

[75] Inventors: Satoru Satake, Tokyo; Yukio Onogi; Kenji Inoue, both of Hiroshima; Masanori Matsuda, Tokyo, all of Japan

[73] Assignee: Satake Corporation, Tokyo, Japan

[21] Appl. No.: 09/154,091

[22] Filed: Sep. 16, 1998

[30] Foreign Application Priority Data

Nov. 28, 1997 [JP] Japan ................................. 9-344226
May 11, 1998 [JP] Japan ................................. 10-127977

[51] Int. Cl.$^7$ .............................. H02K 11/00; H02P 9/10
[52] U.S. Cl. ............................................ 310/68 R; 322/68
[58] Field of Search ............................ 310/68 R; 322/68

[56] References Cited

U.S. PATENT DOCUMENTS

| 4,695,939 | 9/1987 | Canay ........................................ 363/39 |
| 4,851,758 | 7/1989 | Osada et al. ............................... 322/63 |

FOREIGN PATENT DOCUMENTS

| 0 696 834 | 2/1996 | European Pat. Off. . |
| 58-003554 | 1/1983 | Japan . |
| 7-087717 | 3/1995 | Japan . |

*Primary Examiner*—Clayton LaBalle
*Attorney, Agent, or Firm*—Fish & Richardson PC

[57] ABSTRACT

A brushless three-phase synchronous generator includes a stator having primary generating windings and stator excitation windings whose number of poles is odd-number times the number of poles of the primary generating windings. The generator further includes a cylindrical rotor on which a plurality of field windings are wound in a full-pitch concentrated winding form. The plurality of field windings are respectively short-circuited by the corresponding diodes. A plurality of field windings in which voltages of the same phase are induced based on the odd-order spatial higher harmonic magnetic fields are connected in parallel and further connected in parallel to the central field windings which effectively produce primary field magnetic fluxes. A circulating rectifier element is connected in parallel to the central field windings. Improvement in the waveforms of the primary magnetic fields can be achieved and self-excitation in the case where the single-phase loads are connected can be prevented from occurring while magnetic coupling of the rotor field windings to the spatial higher harmonic components of the armature reaction magnetic fields is effectively maintained well.

4 Claims, 5 Drawing Sheets

BRUSHLESS THREE-PHASE SYNCHRONOUS GENERATOR HAVING ENHANCED ROTOR FIELD SYSTEM

BACKGROUND OF THE INVENTION (1) Field of the Invention

The present invention relates to a brushless three-phase synchronous generator. More particularly, the present invention relates to a circuit construction of the rotor field windings for use in the brushless three-phase synchronous generator, which is so devised that an improvement is made on waveform of the current flowing in the rotor field windings induced based on the odd-order higher harmonic magnetic fluxes generated by the stator excitation windings and that an enhancement is achieved on the excitation efficiency.

(2) Description of the Related Art

First, a conventional brushless three-phase synchronous generator is explained with reference to FIGS. 1 and 2. FIG. 1 shows a circuit diagram of the conventional brushless three-phase synchronous generator 40. At a stator side 41, there are provided three-phase four-pole primary generating windings 42, stator excitation windings 43 whose number of poles is 12, odd-number times the number of poles of the primary generating windings 42, and a DC power source 44 which is formed by a variable resistor 48 and a plurality of diodes 49. On the other hand, at a rotor side 45, there are provided a plurality of rotor field windings 46 wound in a full-pitch concentrated winding manner, whose number of poles is the same as that of the primary generating windings 42 of the rotor 41. Each of the rotor field windings is short-circuited by a diode 47.

FIG. 2 shows a further detailed construction of the rotor 45. The plurality of field windings $W_{f1}-W_{f6}$ (generally shown by numeral 46 in FIG. 1) are wound on a cylindrical field system 20 so as to form a four-pole construction, and the field windings $W_{f1}-W_{f6}$ are respectively short-circuited by the corresponding diodes D1–D6 (generally shown by numeral 47 in FIG. 1).

Operation of the above brushless three-phase synchronous generator 40 under a non-load state is as follows. Upon the initial rotation of the stator 45, there is induced an electromotive force in the primary generating windings 42 of the stator due to the residual magnetism of the rotor iron. This electromotive force causes the alternating current (AC) to flow in the primary generating windings 42 through the DC power source 44 and also the stator excitation windings 43. Based on this AC current, there are produced armature reaction magnetic fields around the primary generating windings 42. DC currents flowing in the stator excitation windings 43 due to the function of the DC power source 44 produce a static magnetic field around the stator excitation windings 43. The overlapped magnetic fields formed by the armature reaction magnetic field and the static magnetic field cause the electromotive forces to be induced in the plurality of respective field windings 46 of the rotor 45, which field windings are magnetically coupled with all the odd-order spatial higher harmonic components of the armature reaction magnetic fields and the static magnetic fields. The electromotive forces thus induced in the field windings are respectively half-wave rectified by the corresponding diodes D1–D6, and the DC components thus obtained function to increase the field magnetic fluxes of the rotor. As the field magnetic fluxes increase, the electromotive forces induced in the primary generating windings 42 of the stator also increase. In this way, the generated voltage gradually goes up and finally reaches the self-establish maximum voltage at the non-load state.

Here, as the rotor field windings 46 ($W_{f1}-W_{f6}$) are wound in a full-pitch concentrated winding manner so as to have the same number of poles as that of the primary generating windings 42 of the stator and further they are respectively short-circuited by the corresponding diodes 47 (D1–D6), they react with all the odd-order spatial higher harmonic components and, therefore, function to increase the field magnetic fluxes of the rotor field windings 46.

In the case where the balanced resistor loads or balanced inductive loads are connected to the output terminals X, Y and Z of the generator 40, load currents flow in the primary generating windings 42 and, thus, the armature reaction magnetic fields produced around the primary generating windings 42 are increased due to the load currents. Therefore, the odd-order spatial higher harmonic magnetic fields of the armature reaction magnetic fields increase in proportion to the increase in the load currents. The increase in the odd-order spatial higher harmonic magnetic fields causes the increase in the electromotive forces induced in the rotor field windings 46 accordingly and, therefore, the electromotive forces induced in the primary generating windings increase due to the increase in the primary magnetic fluxes of the rotor. For this reason, since the impedance voltage drop in the primary generating windings 42 caused by the load currents is compensated by the increase in the induced electromotive forces therein, the capacity required to the DC power source 44 can be reduced by this extent of compensation.

Because the current to flow in the rotor field windings which are magnetically coupled with the stator excitation windings is determined by the ampere-turn law and the field magnetomotive forces are produced based on the DC components obtained by half-wave rectification of the current flowing in the field windings, in the case where the number of the field windings is small, the amplification factor, that is, the ratio of the magnetomotive force of the field windings with respect to that of the stator excitation windings is small and, thus, the capacitor required to the automatic voltage regulator (AVR) inevitably becomes large. For this reason, there has been a demand for developing an improved generator having high excitation efficiency in which the amplification factor of the magnetomotive forces is large and by which the capacitor of the automatic voltage regulator can be reduced.

Since the field windings are wound on the periphery of the rotor with evenly distributed, some of the field windings do not effectively produce the field magnetic flux, resulting in lowering of the generator efficiency. Thus, the improvement in the generator efficiency has been a long standing demand.

Further, in the case where unbalanced three-phase loads or single-phase loads are connected to the generator, though there occurs a compensation operation, electromotive forces are induced in the rotor field windings due to the armature reaction magnetic fields of the opposite-phase and the alternating current of the double frequency is caused to flow in the field windings because the opposite-phase armature reaction magnetic fields interlink with the field windings at a speed twice the synchronous speed. These phenomena stem from the fact that rotor field windings function also as damper windings. Where the number of field windings is large, the function to increase the magnetic fields becomes large and, thus, there is a likelihood of the output voltage becoming excessively high.

SUMMARY OF THE INVENTION

An object of the present invention, therefore, is to overcome the problems existing in the prior art generator, and to provide a brushless three-phase synchronous generator wherein the magnetic coupling of the rotor field windings of the full-pitch concentrated form with respect to the spatial higher harmonic components of the armature reaction magnetic fields is maintained well.

According to one aspect of the invention, there is provided a brushless three-phase synchronous generator which comprises a stator including primary generating windings and stator excitation windings having the number of poles odd-number times the number of poles of the primary generating windings, and a rotor including a cylindrical field system which is magnetically coupled with the primary generating windings, the synchronous generator comprising:

a plurality of field windings wound on the cylindrical field system in a full-pitch winding form and having the same number of poles as that of the primary generating windings;

circulating means each connected in parallel to each of central field windings among the plurality of field windings, the central field windings each forming a primary field magnetic flux based on odd-order spatial higher harmonic magnetic field produced by the stator excitation windings; and rectifier means connected in series with a plurality of predetermined field windings other than the central field windings among the plurality of field windings, in the plurality of predetermined field windings, voltages of the same phase being induced which voltages have predetermined different phase with respect to the phase of voltage induced in the central field windings based on the odd-order spatial higher harmonic magnetic field, wherein series circuits of the predetermined field windings and rectifier means are respectively connected in parallel with the central field windings, thereby to increase a field magnetomotive force of the primary field magnetic flux produced by each of the central field windings.

The rectifier means may be a plurality of diodes each connected in series with each of the plurality of predetermined field windings other than the central field windings.

The rectifier means may be at least one diode connected in series with the plurality of predetermined field windings other than the central field windings, the plurality of predetermined field windings forming an AC component loop circuit.

The circulating means may be constituted by diodes.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, some preferred embodiments of the brushless three-phase synchronous generator according to the invention will be explained with reference to the accompanying drawings.

Figure 1:
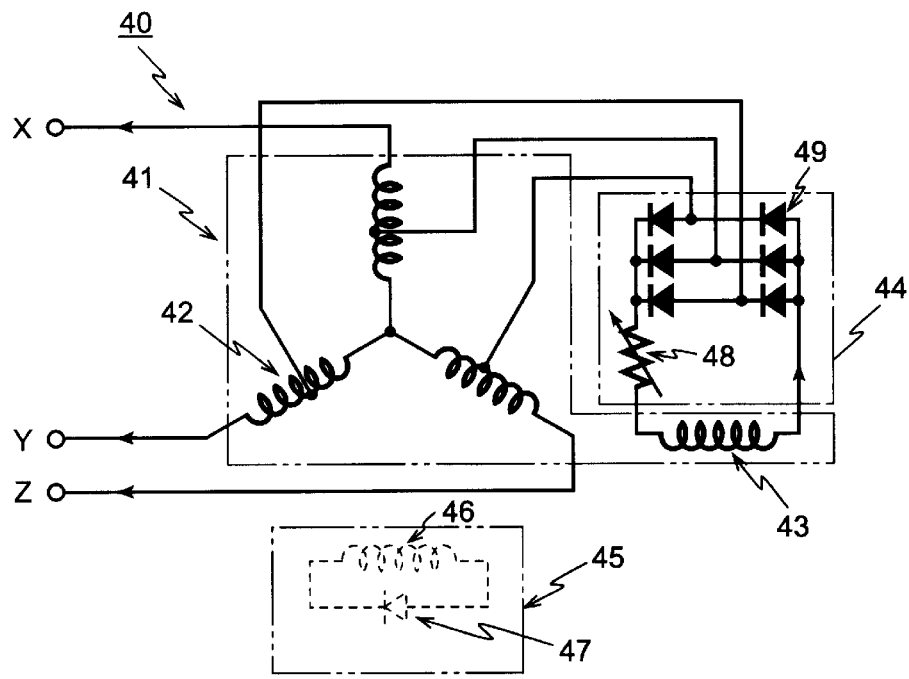
FIG. 1 is a circuit diagram of the conventional brushless three-phase synchronous generator.
Figure 2:
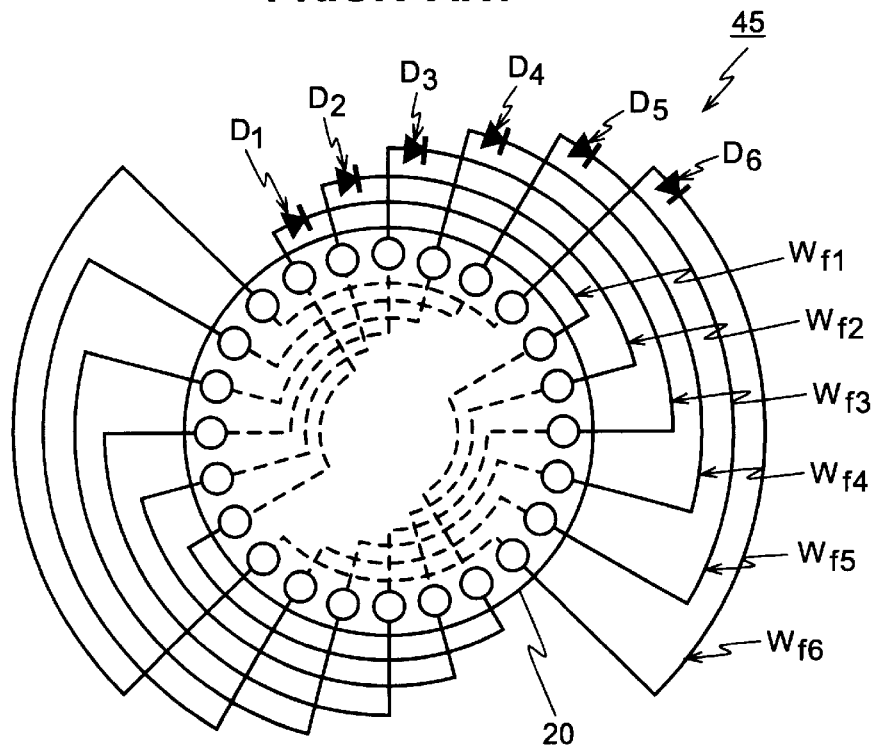
FIG. 2 is a circuit diagram of the rotor portion of the conventional brushless three-phase synchronous generator.
Figure 3:
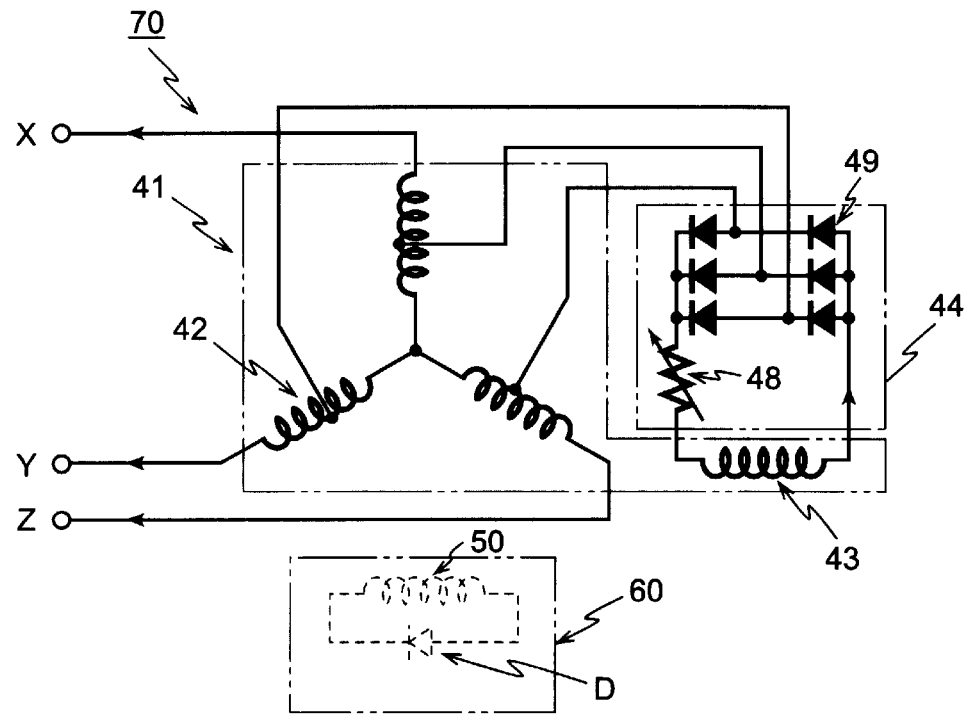
FIG. 3 is a circuit diagram of the brushless three-phase synchronous generator according to the present invention.
Figure 4:
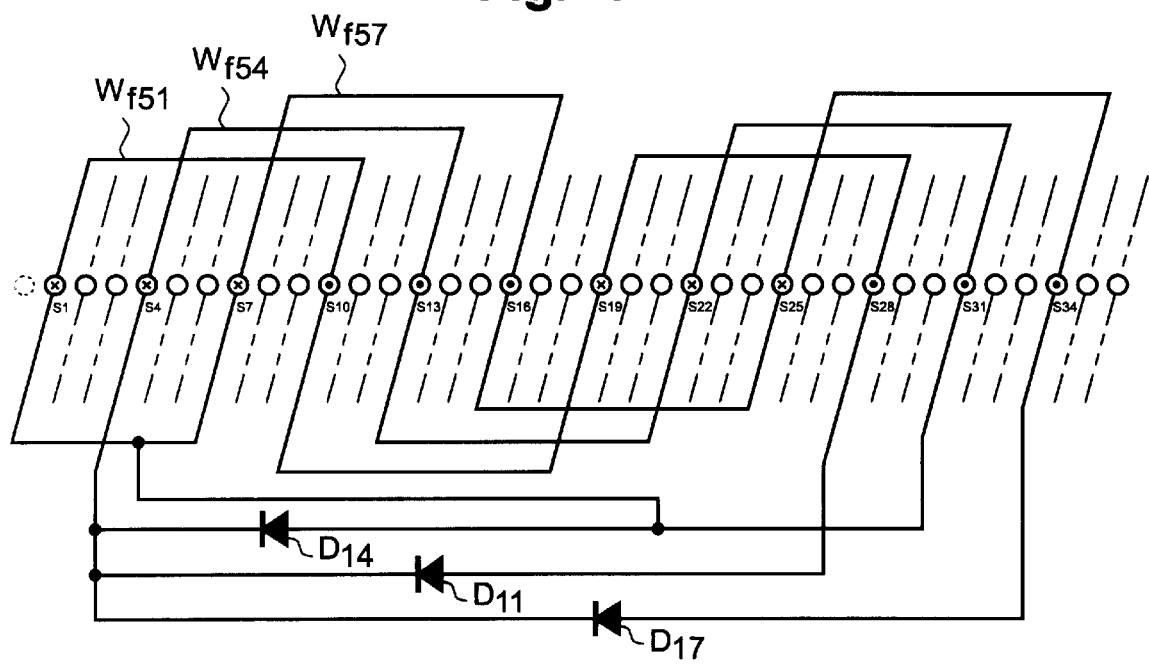
FIG. 4 is a circuit diagram of one set of the rotor windings of the generator according to the present invention.
Figure 5:
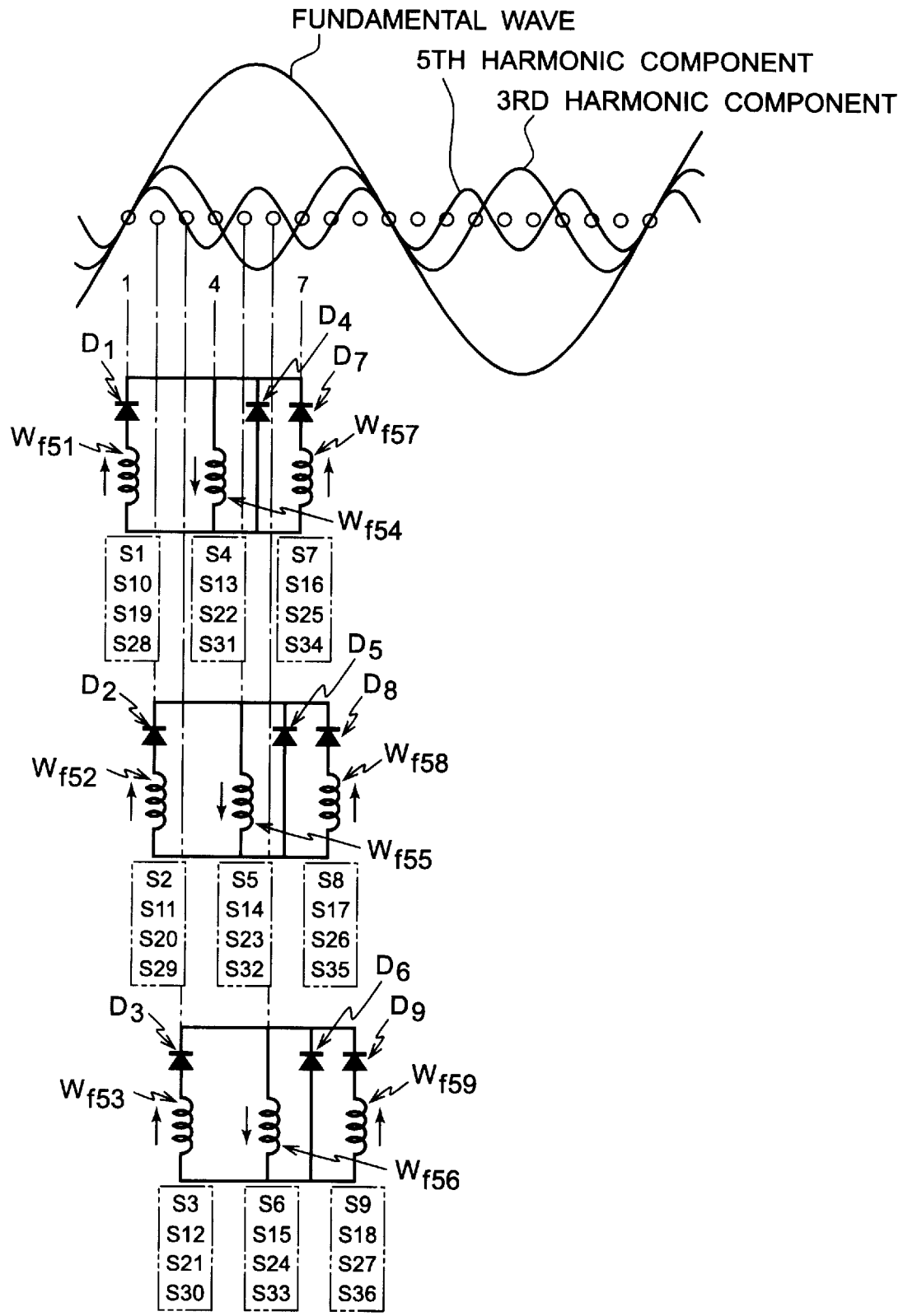
FIG. 5 is a circuit diagram showing the connection of three sets of the plurality of rotor windings.
Figure 6:
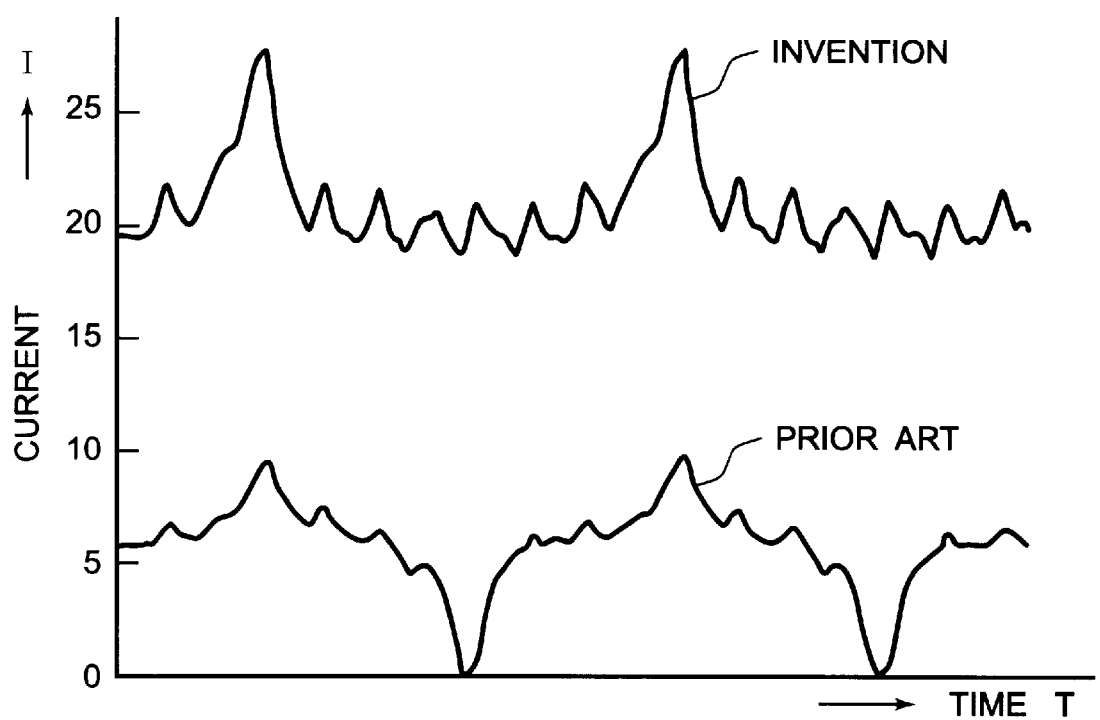
FIG. 6 is a graph showing waveforms of currents in the rotor field windings of the conventional generator and the generator according to the present invention.

FIGS. 3, 4, 5 and 6 show a first embodiment of the brushless three-phase synchronous generator 70 according to the invention. FIG. 3 shows a circuit diagram of the generator 70 according to the invention. As noted from FIG. 3, the difference of the generator 70 of the present invention from the conventional one 40 shown in FIG. 1 resides only at the rotor side 60. FIG. 4 shows a circuit diagram of one set, among three sets in total, of the field windings of the rotor. FIG. 5 is a further detailed diagram showing the connection of the three sets of the plurality of rotor windings $W_{f51}$–$W_{f59}$. FIG. 6 shows a graph showing the currents in the field windings of the generator according to the present invention and those of the conventional generator.

The stator side 41 of the generator 70 according to the present invention is the same as that of the conventional one. Specifically, the stator 41 comprises primary generating windings 42 of three-phase four-pole, stator excitation windings 43 whose number of poles is 12, the odd-number times the number of poles of the primary generating windings 42, and a DC power source 44 which has a plurality of three-phase bridge-connection diodes 49 and a variable resistor 48. On the other hand, the rotor side 60, there are wound a plurality of rotor field windings 50 in the full-pitch concentrated winding form, which windings have the same number of poles as that of the primary generating windings 42. In this example, the number of poles is four. Though, in the conventional generator 40 shown in FIG. 1, the rotor field windings 46 are respectively short-circuited by the corresponding diodes 47 (D1–D7), the rotor field windings 50 of the generator 70 according to the present invention are connected as shown in FIG. 4. Explanation for the rotor of the embodiments is made here-under on the assumption that the number of slots provided in the rotor core is thirty six (36) and the field windings are wound therein so as to be of four (4) poles. Nine (9) slots per one pole are assigned on the rotor core. One set of the field windings are wound on twelve slots over four poles. There are provided three sets, in total, of such set of field windings on the rotor core.

Referring to FIG. 5, there are wound, on the cylindrical rotor core, nine field windings $W_{f51}$–$W_{f59}$ (generally represented by numeral 50 in FIG. 3) in the full-pitch concentrated winding form so as to be four poles, through the semiconductor elements D11–D19. The field windings $W_{f51}$ and $W_{f57}$ in which the same phase voltages are induced by the third-order spatial harmonic magnetic field are connected in parallel and, then, further connected in parallel to the central field windings $W_{f54}$ which function to effectively produce primary field magnetic fluxes. Throughout the specification, the term used for "central field windings" is to represent the field windings which produce greater magnetic fluxes than other field windings when producing primary field magnetic fluxes. Similarly, the field windings $W_{f52}$ and $W_{f58}$ connected in parallel are further connected in parallel to the central field windings $W_{f55}$, and the field windings $W_{f53}$ and $W_{f59}$ connected in parallel are further connected in parallel to the central field windings $W_{f56}$. The semiconductor elements D11–D19 are generally such rectifier means as diodes.

More specifically, FIG. 5 shows the positional relationships of the field windings $W_{f51}$–$W_{f59}$ wound in the slots S1–S36 of the rotor with respect to the phases of the spatial fundamental wave of the static magnetic field, the third-order spatial harmonic component and the fifth-order spatial harmonic component of the armature reaction magnetic field. The field windings $W_{f51}$ and $W_{f57}$ in which the voltages of the same phase are induced based on the third-order spatial harmonic magnetic field, among the plurality of the full-pitch concentrated field windings, are connected in parallel with each other and then further connected in parallel to the central field windings $W_{f54}$ in which the voltage of the opposite-phase is induced.

Now, operation of the brushless three-phase synchronous generator 70 constructed as above is explained below. Upon the initial rotation of the rotor 60, an electromotive force is induced in the primary generating windings 42 based on the pre-established residual magnetism of the rotor iron. The residual magnetism in the rotor may be established by any method well known in the art. For example, the residual magnetism in the rotor may be established by momentarily connecting an external D.C. power source to the stator excitation windings 43 at an initial stage. This electromotive force thus induced causes the alternating current (AC) to flow in the primary generating windings 42 through the DC power source 44 and also the stator excitation windings 43. Based on this AC current, armature reaction magnetic fields are produced around the primary generating windings 42. DC currents flowing in the stator excitation windings 43 due to the function of the DC power source 44 produce a static magnetic field around the stator excitation windings 43. The overlapped magnetic fields formed by the armature reaction magnetic fields and the static magnetic field cause the electromotive forces to be induced in the respective field windings 50 of the rotor 60, which windings are magnetically coupled with all the odd-order spatial higher harmonic components of the armature reaction magnetic fields and the static magnetic fields. The electromotive forces thus induced in the field windings 50 are respectively half-wave rectified by the corresponding diodes D11–D19, and the DC components thus obtained increase the primary field magnetic fluxes of the rotor. As the primary field magnetic fluxes increase, the electromotive forces induced in the primary generating windings 42 of the stator also increase. In this way, the voltage at the non-load state is self-established. The operation up to here explained above is the same as that in the conventional generator.

In the generator according to the invention, as shown in FIG. 4, the field windings $W_{f51}$ and $W_{f57}$ in which the voltages of the same phase are induced are connected in parallel through the respective corresponding diodes D11 and D17 (DC conversion circuit). The parallel-connected field windings $W_{f51}$ and $W_{f57}$ are further connected in parallel to the central field windings $W_{f54}$ which function to effectively produce the primary field magnetic fluxes. A circulating means D14 such as a diode is connected in parallel to the central field windings $W_{f54}$.

The currents flowing in the field windings $W_{f51}$ and $W_{f57}$ are respectively half-wave rectified by the corresponding diodes D11 and D17 and, the DC components thus obtained flow into the central field windings $W_{f54}$ which function to effectively produce the primary field magnetic fluxes. Due to the above DC components together with the function of the circulating diode D14, there flows a current having relatively large amount of DC components in the central field windings $W_{f54}$, so that there is an increase in the primary field magnetic fluxes due to the increase in the magnetomotive forces. As a result, as shown in FIG. 6, as compared to the conventional generator, the amount of current flowing in the central field windings $W_{f54}$ greatly increase and the waveform of the current in the field windings is greatly smoothed due to the increase in the DC components. Hence, due to the increase of the magnetomotive forces, improvement of the efficiency of the generator can be effectively achieved.

Figure 7:
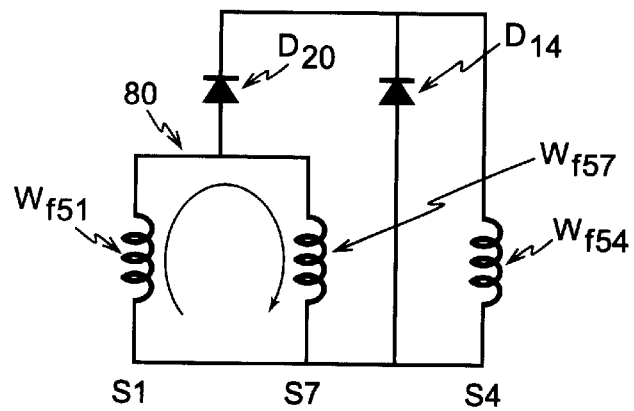
FIG. 7 is a circuit diagram showing the connection of the field windings of the second embodiment according to the present invention.

Next, FIG. 7 shows a second embodiment of the field winding circuit according to the present invention. In this embodiment, the field windings $W_{f51}$ and $W_{f57}$ in which the same phase voltages are induced therein are firstly directly connected in parallel so that an AC component loop circuit 80 is formed and, then, they are connected in parallel to the central field windings $W_{f54}$ through a diode D20. In this embodiment, it should be noted that a plurality of the field windings of the same phase which are directly connected in parallel are further connected in parallel to the central field windings through at least one common diode D20. With the provision of the AC component loop circuit 80 in this embodiment, there flows a circulating current between the field windings concerned since the phase difference of currents flowing therein based on the fundamental wave component of the opposite-phase rotating magnetic field in the case where the single-phase load is connected to the generator, becomes 120 degrees. As a result, since the rectified current flowing into the central field windings $W_{f54}$ through the diode D20 decreases, the field magnetic fluxes produced by the same windings $W_{f54}$ decreases accordingly and, hence, the output voltage is prevented from excessively rising up. Further, disturbance of the current waveforms in the field windings caused by the AC components is prevented from occurring, and generation of the excessive voltage by the self-excitation phenomena which stems from the fact that the field windings have function as damper windings, is prevented from occurring.

Figure 8:
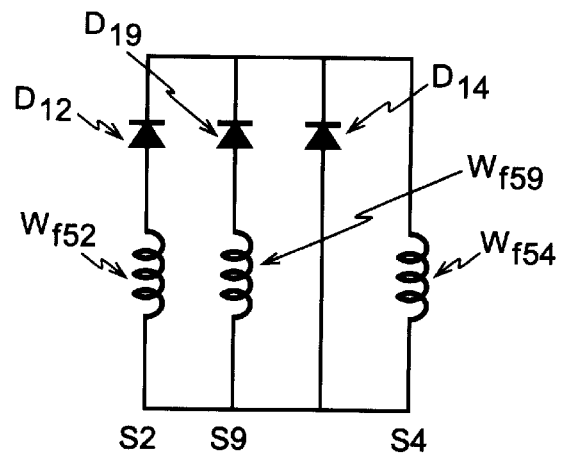
FIG. 8 is a circuit diagram showing the connection of the field windings of the third embodiment according to the present invention.

FIG. 8 shows a third embodiment of the field winding circuit according to the present invention. In this embodiment, among the plurality of field windings $W_{f51}$–$W_{f59}$ of the full-pitch concentrated winding type, the field windings $W_{f52}$ and $W_{f59}$ in which the voltages of the same phase are induced but the above phase is different in predetermined degrees from the phase of the voltage induced in the central field windings $W_{f54}$ by the odd-order spatial higher harmonic magnetic fields, are connected in parallel through the corresponding diodes D12, D14. The parallel-connected field windings $W_{f52}$ and $W_{f59}$ are further connected in parallel to the central field windings $W_{f54}$ to which a circulating diode D14 is connected.

According to the above circuit constructions, as is the same in the above-explained first embodiment, the current to flow in the central field windings $W_{f54}$ increases and further its waveforms are greatly smoothed. There are some cases where, when load is actually connected to the generator, there develops a phase difference between the phase of the current flowing in the central field windings $W_{f54}$ and the current flowing in the field windings $Wf_{52}$ and $Wf_{59}$ both connected to the above central field windings $Wf_{54}$. With the above phase difference being taken into consideration, this third embodiment enables the phase difference to be zero at the time when the load is actually applied to the generator though there exists a phase difference at the time when no load is applied thereto.

As is the same in the second embodiment, the brushless three-phase synchronous generator of the this third embodiment may also have an AC component loop circuit which is formed by the field windings $W_{f52}$ and $W_{f59}$. By so constructing, the AC component having double frequency, which develops in the field windings based on the interlinkage with the opposite-phase rotating magnetic fields at the time when the single-phase load is applied to the generator, can be absorbed by the loop circuit, the disturbance of the current waveforms caused by the AC component can be prevented, and the abnormal high voltage caused by the self-excitation phenomenon of the rotor field windings because of its function as damper windings can be prevented from occurring.

Figure 9:
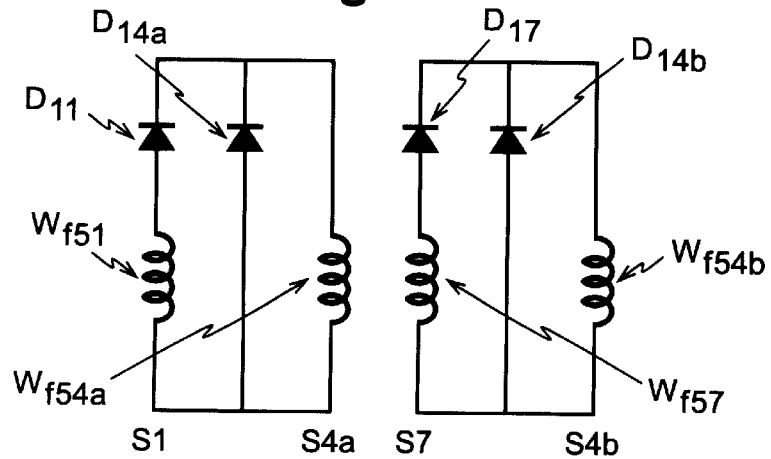
FIG. 9 is a circuit diagram showing the connection of the field windings of the fourth embodiment according to the present invention.

FIG. 9 shows a further embodiment according to the present invention wherein the central field windings $W_{f54}$ are divided into two sub-divided central field windings $W_{f54a}$ and $W_{f54b}$, one for being connected to the field windings $W_{f51}$ and the other for being connected to the field windings $W_{f57}$. This embodiment is particularly advantageous in the case where an interference is expected to occur between the slot S1 (the field windings $W_{f51}$ being provided therein) and the slot S7 (the field windings $W_{f57}$ being provided therein).

As has been explained hereinabove, according to the synchronous generator of the instant invention; since the currents flowing in the field windings which do not effectively produce field magnetic fluxes are half-wave rectified by diodes and, then, the currents of DC component thus obtained are caused to collectively flow into the central field windings which effectively produce primary field magnetic fluxes, the current of DC component flowing in the central field windings increases and its current waveforms are greatly smoothed. As the current is greatly smoothed, the field magnetomotive forces become large and the excitation efficiency is improved, whereby the efficiency of the generator is significantly enhanced.

There is a tendency that there occurs a difference in phase, at the time when load is actually connected to the generator, between the phase of the current flowing in the central field windings and the phase of the current flowing in other field windings in which the currents of theoretically the same phase flow. With this difference in phase being taken into consideration, it can be made possible that the same phase can be achieved at the load state though there exists a phase difference at the non-load state.

With the provision of the loop circuit which is formed by directly connecting at least two field windings in parallel and which is for absorbing the AC component of the double frequency that is generated based on the interlinkage with the opposite-phase rotating magnetic field at the time when the single-phase load is connected to the generator, the disturbance of the current waveforms caused by the AC components can be effectively prevented and the excessive high voltage based on the self-excitation phenomenon because of the rotor field windings' function as damper windings can be prevented from generated.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A brushless three-phase synchronous generator which comprises a stator including primary generating windings and stator excitation windings having a number of poles that is an odd-number times the number of poles of said primary generating windings, and a rotor including a cylindrical field system which is magnetically coupled with said primary generating windings, said rotor having a pre-established residual magnetism, said synchronous generator comprising:

a plurality of field windings wound on said cylindrical field system in a full-pitch winding form and having a same number of poles as that of said primary generating windings;

circulating means each connected in parallel to each of central field windings among said plurality of field windings, said central field windings each forming a primary field magnetic flux based on odd-order spatial higher harmonic magnetic fields produced by said stator excitation windings; and rectifier means connected in series with a plurality of predetermined field windings other than said central field windings among said plurality of field windings, in said plurality of predetermined field windings, voltages of a same phase being induced which voltages have predetermined different phase with respect to the phase of voltage induced in said central field windings based on said odd-order spatial higher harmonic magnetic fields, wherein series circuits of said predetermined field windings and rectifier means are respectively connected in parallel with said central field windings.

2. A brushless three-phase synchronous generator according to claim 1, in which said rectifier means comprises a plurality of diodes each connected in series with each of said plurality of predetermined field windings other than said central field windings.

3. A brushless three-phase synchronous generator according to claim 1, in which said rectifier means comprises at least one diode connected in series with said plurality of predetermined field windings other than said central field windings.

4. A brushless three-phase synchronous generator according to claim 1, in which said circulating means comprises diodes.

* * * * *